United States Patent
Azuma et al.

(10) Patent No.: US 8,755,205 B2
(45) Date of Patent: Jun. 17, 2014

(54) LEAKAGE CURRENT REDUCTION APPARATUS THAT INCLUDES A VOLTAGE AMPLIFIER AND A VOLTAGE APPLICATOR

(75) Inventors: Satoshi Azuma, Tokyo (JP); Takuya Sakai, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 41 days.

(21) Appl. No.: 13/254,497

(22) PCT Filed: Mar. 4, 2010

(86) PCT No.: PCT/JP2010/001518
§ 371 (c)(1),
(2), (4) Date: Sep. 2, 2011

(87) PCT Pub. No.: WO2010/100934
PCT Pub. Date: Sep. 10, 2010

(65) Prior Publication Data
US 2011/0317455 A1 Dec. 29, 2011

(30) Foreign Application Priority Data
Mar. 5, 2009 (JP) ................................. 2009-051519

(51) Int. Cl.
*H02M 5/45* (2006.01)

(52) U.S. Cl.
USPC ............................................................ 363/37

(58) Field of Classification Search
USPC ........... 363/34–37, 74, 81, 84, 89, 95, 97, 98, 363/124, 125, 127, 131, 132
See application file for complete search history.

(56) References Cited

U.S. PATENT DOCUMENTS 3,857,096 A * 12/1974 Gregory ......................... 324/127
5,373,223 A * 12/1994 Akagi et al. ................... 318/722
(Continued)

FOREIGN PATENT DOCUMENTS

CN 1465130 A 12/2003
JP 7-115339 A 5/1995
(Continued)

OTHER PUBLICATIONS

International Search Report issued Jun. 1, 2010 in PCT/JP10/01518 filed Mar. 4, 2010.

(Continued)

*Primary Examiner* — Adolf Berhane
*Assistant Examiner* — Jeffrey Gblende
(74) *Attorney, Agent, or Firm* — Oblon, Spivak, McClelland, Maier & Neustadt, L.L.P.

(57) ABSTRACT

Three-phase windings 11-13 and 21-23 of a first common-mode transformer 1 and a second common-mode transformer 2 are connected in series through connecting lines 8r-8t, respectively. The windings 11-13 are connected to an unillustrated AC power supply by connecting lines 91r-91t. The windings 21-23 are connected to a three-phase motor by connecting lines 93r-93t and through a converter and an inverter which are unillustrated. A winding 14 for common-mode voltage detection detects high-frequency leakage currents flowing through the connecting lines 91r-91t as a common-mode voltage V1, and an output voltage V2 obtained by voltage amplification by a voltage amplifier 3 is applied to a winding 24 for common-mode voltage application in such a manner that the output voltage V2 works in generally the same direction as the common-mode voltage V1, thereby canceling out the high-frequency leakage currents through the windings 21-23. Since a voltage amplification method is used, it is possible to reduce the high-frequency leakage currents with a simpler configuration as compared to a conventional current amplification method.

13 Claims, 13 Drawing Sheets

(56) References Cited

U.S. PATENT DOCUMENTS

| | | | |
|---|---|---|---|
| 5,831,842 A * | 11/1998 | Ogasawara et al. | 363/40 |
| 6,134,126 A * | 10/2000 | Ikekame et al. | 363/39 |
| 6,151,228 A * | 11/2000 | Miyazaki et al. | 363/48 |
| 6,208,098 B1 * | 3/2001 | Kume et al. | 318/400.25 |
| 7,602,228 B2 * | 10/2009 | Mazzola et al. | 327/423 |
| 2002/0075702 A1 * | 6/2002 | Igarashi et al. | 363/35 |

FOREIGN PATENT DOCUMENTS

| | | |
|---|---|---|
| JP | 9 215 341 | 8/1997 |
| JP | 10 094244 | 4/1998 |
| JP | 11 122953 | 4/1999 |
| JP | 2000201044 A * | 7/2000 |
| JP | 2003-87973 | 3/2003 |
| JP | 2004 357447 | 12/2004 |
| JP | 2005 204395 | 7/2005 |
| JP | 2008 061375 | 3/2008 |
| JP | 2008 061403 | 3/2008 |

OTHER PUBLICATIONS

Office Action issued May 28, 2013, in Japanese Patent Application No. 2011-502660 with English translation.
Combined Office Action and Search Report issued Sep. 4, 2013 in Chinese Patent Application No. 201080010577.0 with English translation and English translation of categories of cited documents.
Japanese Office Action issued Jan. 7, 2014, in Japanese Patent Application No. 2011-502660 (with English Translation).

* cited by examiner

LEAKAGE CURRENT REDUCTION APPARATUS THAT INCLUDES A VOLTAGE AMPLIFIER AND A VOLTAGE APPLICATOR

TECHNICAL FIELD

The present invention relates to a leakage current reduction apparatus for reducing a leakage current which can occur in a power converting apparatus or the like which is connected to an AC power supply and outputs a desired AC voltage, for example.

BACKGROUND ART

A high-frequency leakage current reduction apparatus known as a conventional leakage current reduction apparatus for reducing high-frequency leakage currents that can occur in three-phase power lines laid between an inverter and a three-phase motor, for example, includes a current detection coil for detecting the high-frequency leakage currents, a high frequency amplifier for amplifying the detected high-frequency leakage currents and a matching coil which electromagnetically injects the amplified high-frequency leakage currents into the three-phase power lines in opposite phase (refer to Patent Document 1, for example).

PRIOR ART DOCUMENT

Patent Document

Patent Document 1: Japanese Laid-open Patent Application No. 1997-215341 (paragraph 0015 and FIG. 1)

SUMMARY OF THE INVENTION

Problems to be Solved by the Invention

The conventional high-frequency leakage current reduction apparatus detects common-mode high-frequency leakage currents by means of the current detection coil. The high-frequency leakage currents detected by the current detection coil are supplied to the high frequency amplifier and are amplified in power. To detect the high-frequency leakage currents themselves, it is necessary to reduce detection-side impedance. Since common-mode impedance of the current detection coil is made smaller in this case, there has been a problem that the current detection coil is not expected to produce a common-mode noise reduction effect.

Also, the common-mode high-frequency leakage currents are electromagnetically injected into the three-phase power lines in opposite phase through the matching coil after the common-mode high-frequency leakage currents have been amplified. In a case where the opposite-phase currents supplied in this way are equal to zero-phase-sequence high-frequency leakage currents, it is possible to nullify the high-frequency leakage currents because the opposite-phase and zero-phase-sequence currents cancel out each other. Here, there has however been a problem that although the high-frequency leakage currents are zeroed if the amplitude and phase of the injected currents have desired values, a sufficient noise reduction effect becomes unobtainable in actuality owing to variations in component properties and temperature changes, for instance. Provision of a control circuit additionally connected to cancel out such adverse effects would give rise to another problem that this approach would result in an increase in the number of components and increased complexity of a circuit configuration.

Furthermore, while the high-frequency leakage current reduction apparatus is connected in the three-phase power lines laid between the inverter and the three-phase motor, no consideration is given to a power supply side from which energy is supplied to the inverter. In a case where the power supply side provides an AC source which is converted into DC power to supply energy to the inverter, for instance, a rectifier that converts the AC source into the DC power produces high-frequency leakage currents. A problem here is that no consideration is given to measures for reducing this kind of high-frequency leakage current.

The present invention has been made to solve the aforementioned problems and it is an object of the invention to obtain a leakage current reduction apparatus which makes it possible to reduce leakage currents with a simple configuration.

Means for Solving the Problems

A leakage current reduction apparatus according to the present invention includes a voltage detector, a voltage amplifier and a voltage applicator, the leakage current reduction apparatus being inserted between a first electrical device and a second electrical device by way of connecting lines, wherein the voltage detector detects a leakage current flowing through the connecting lines as a detected voltage, the voltage amplifier amplifies the detected voltage and outputs an amplified voltage as an output voltage, and the voltage applicator generates an application voltage to be applied to the connecting lines on the basis of the output voltage, the application voltage being oriented in generally the same direction as the detected voltage.

Advantageous Effects of the Invention

Since this invention is a leakage current reduction apparatus including a voltage detector, a voltage amplifier and a voltage applicator, the leakage current reduction apparatus being inserted between a first electrical device and a second electrical device by way of connecting lines, wherein the voltage detector detects a leakage current flowing through the connecting lines as a detected voltage, the voltage amplifier amplifies the detected voltage and outputs an amplified voltage as an output voltage, and the voltage applicator generates an application voltage to be applied to the connecting lines on the basis of the output voltage, the application voltage being oriented in generally the same direction as the detected voltage, it is possible to reduce the leakage current with a simple configuration.

MODES OF CARRYING OUT THE INVENTION

First Embodiment

Figure 1:
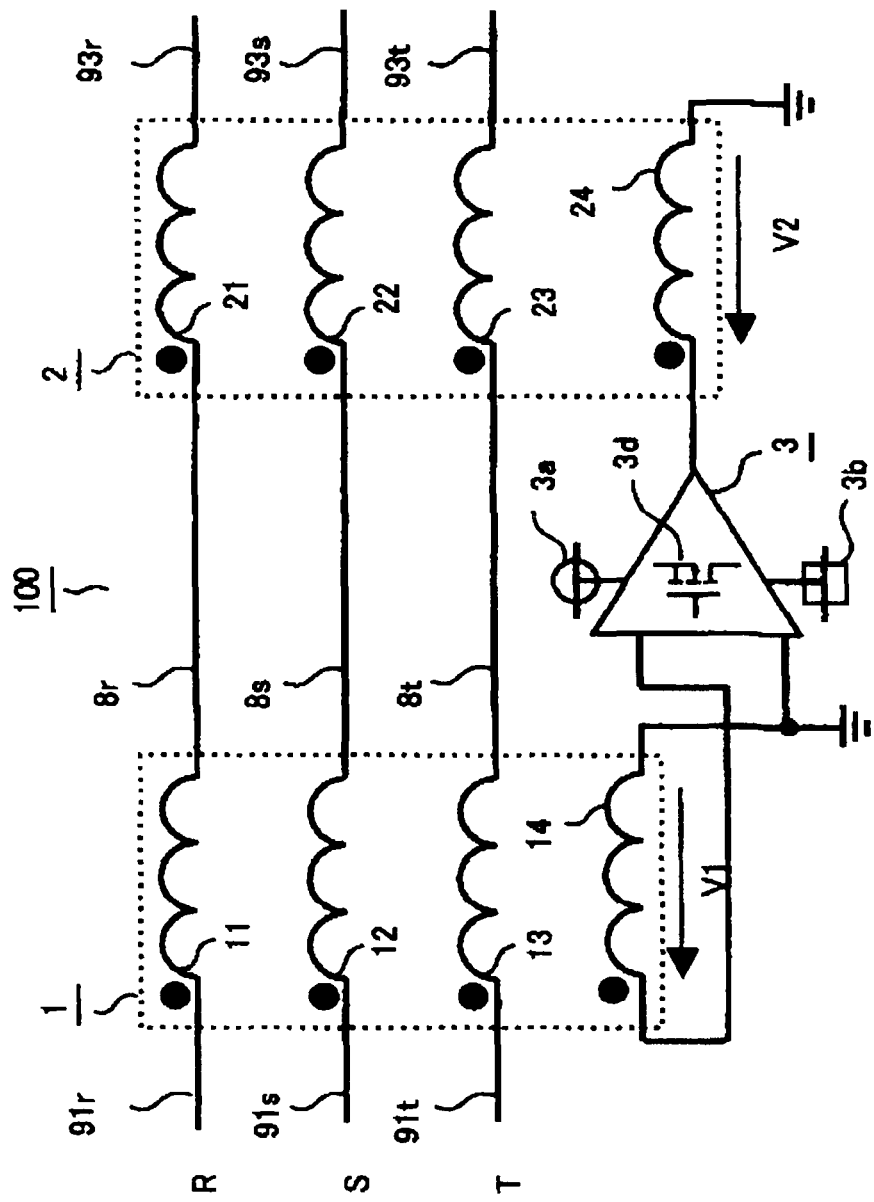
FIG. 1 is a configuration diagram illustrating a high-frequency leakage current reduction apparatus according to a first embodiment of the present invention.
Figure 2:
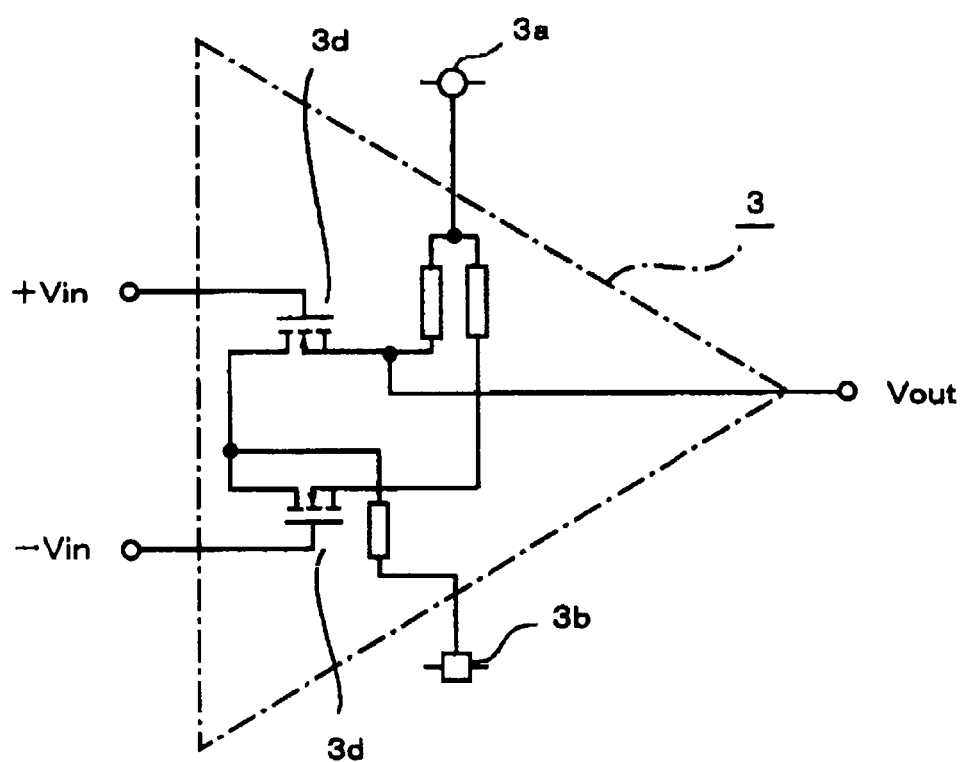
FIG. 2 is a circuit diagram illustrating details of an amplifier of FIG. 1.
Figure 3:
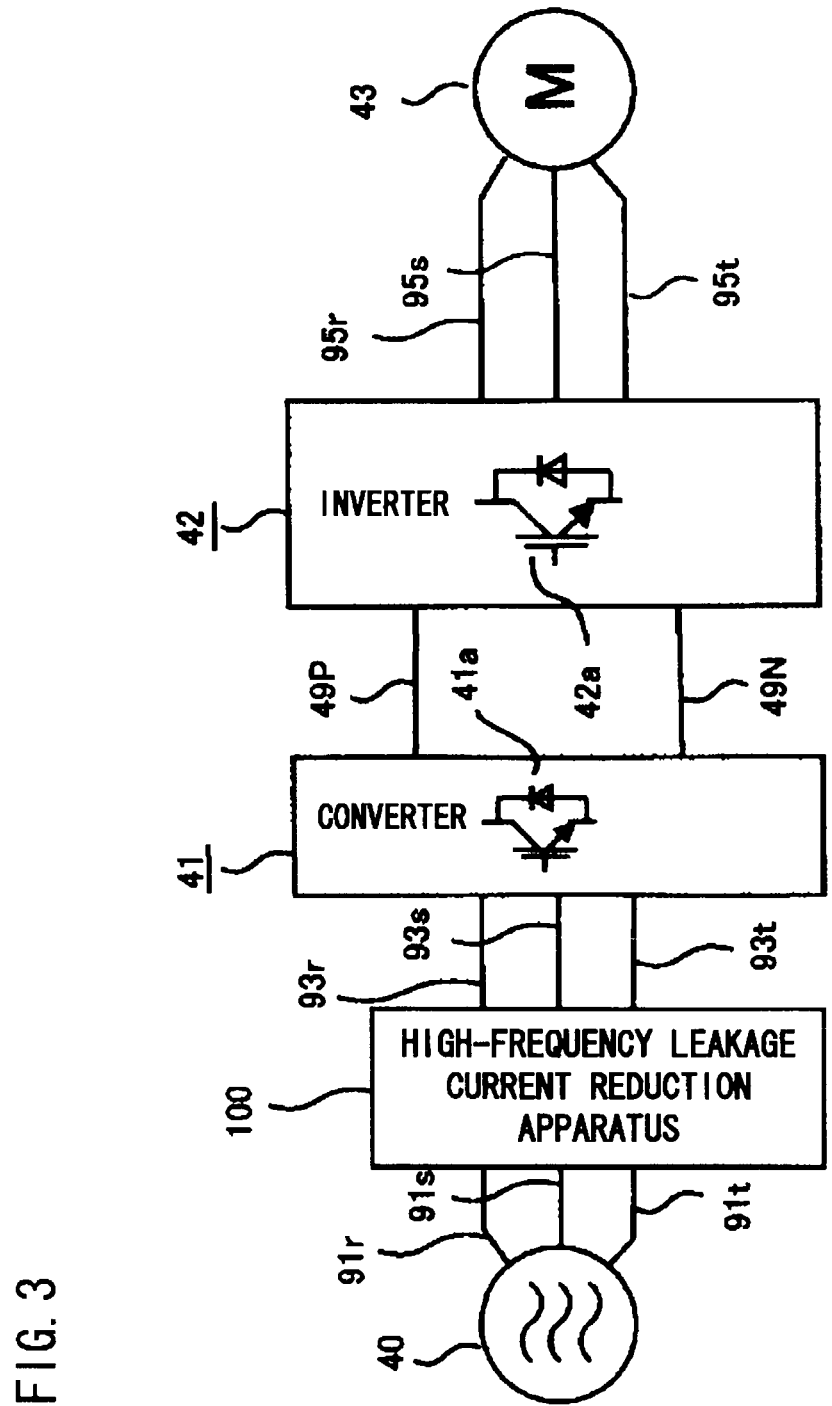
FIG. 3 is a connection diagram illustrating an example of connection of the high-frequency leakage current reduction apparatus according to the first embodiment.
Figure 4:
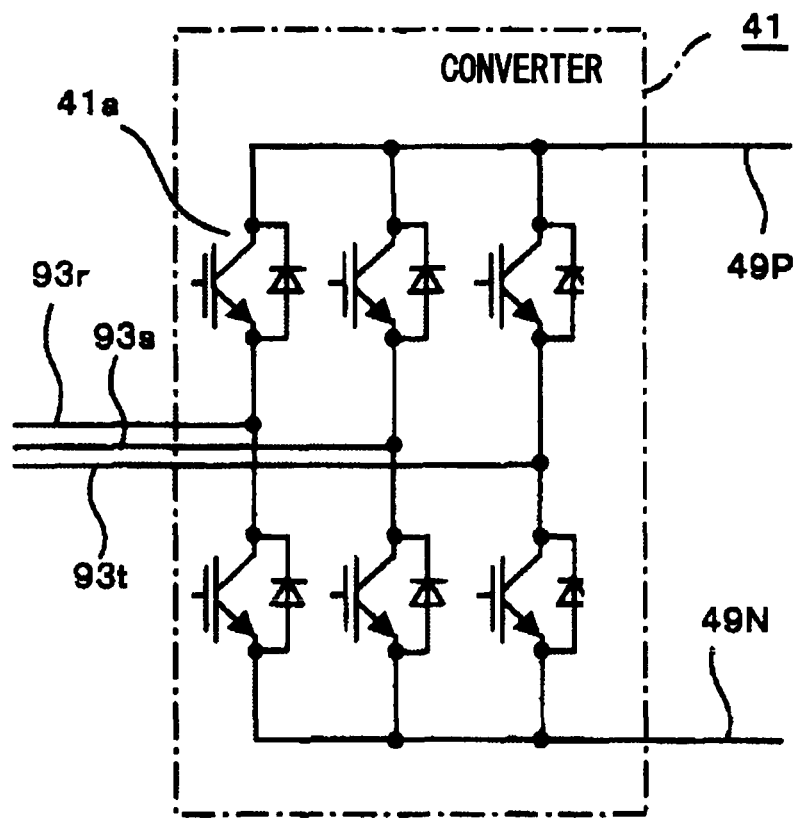
FIG. 4 is a circuit diagram illustrating details of a converter.
Figure 5:
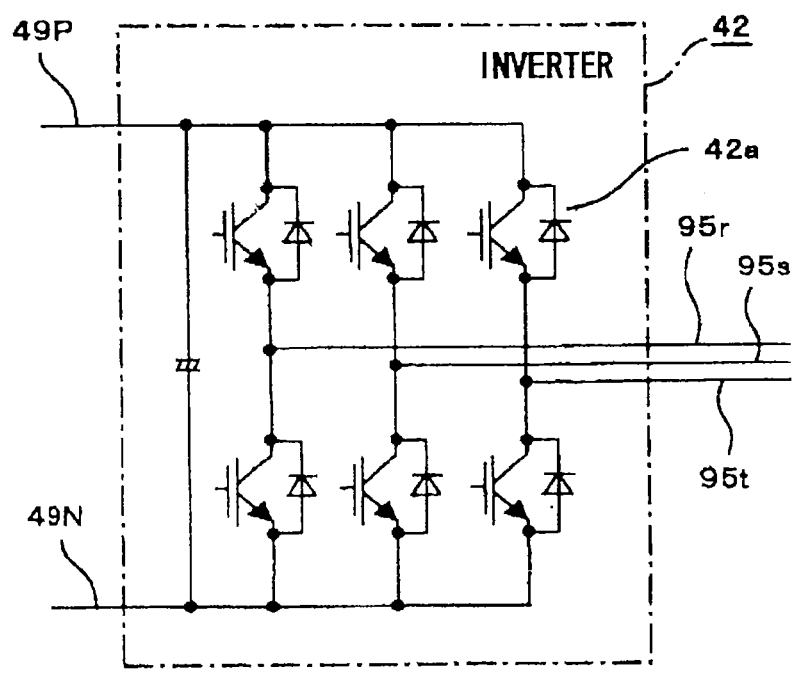
FIG. 5 is a circuit diagram illustrating details of an inverter.
Figure 6:
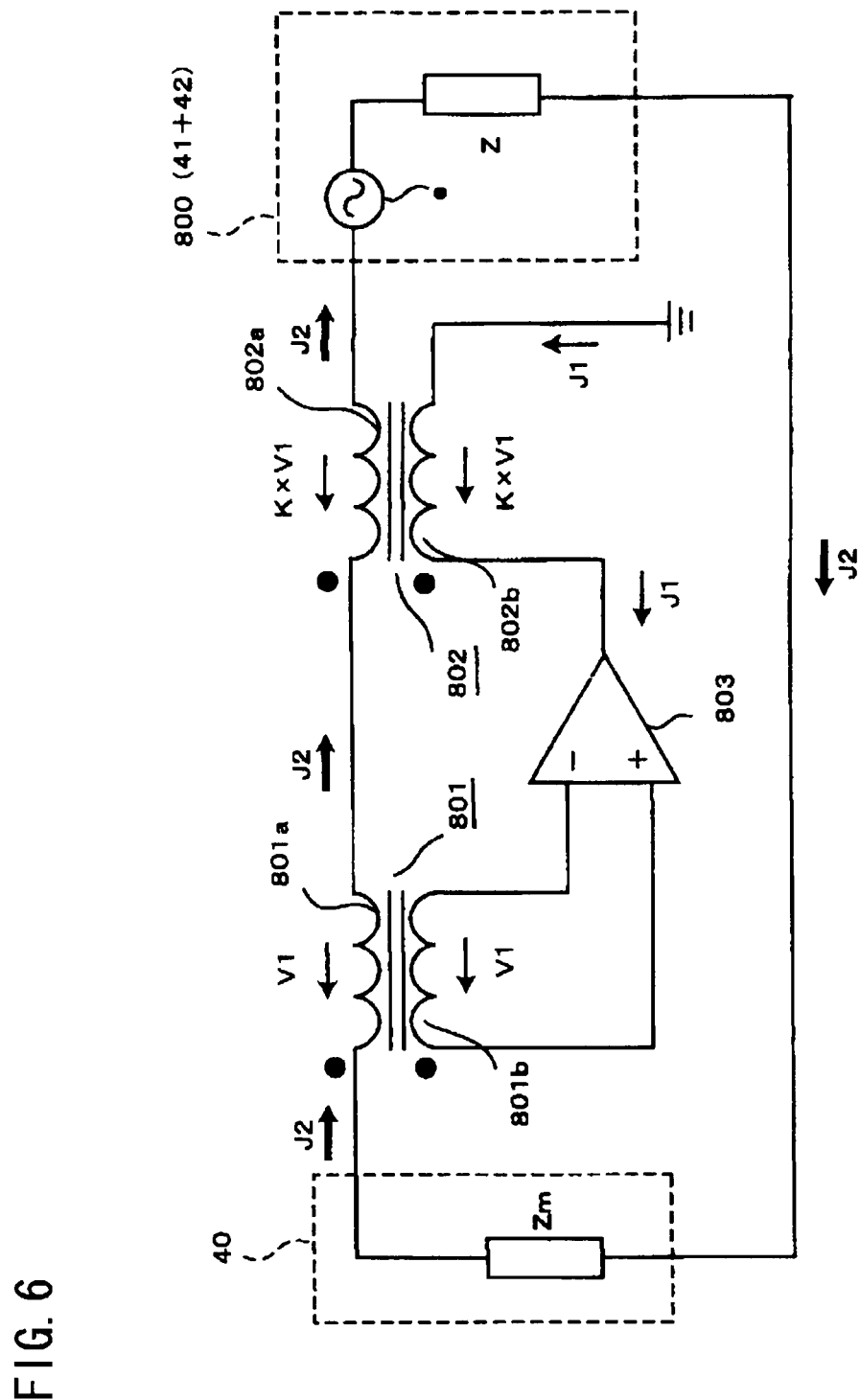
FIG. 6 is a circuit diagram illustrating an equivalent circuit of the high-frequency leakage current reduction apparatus of FIG. 1.
Figure 7:
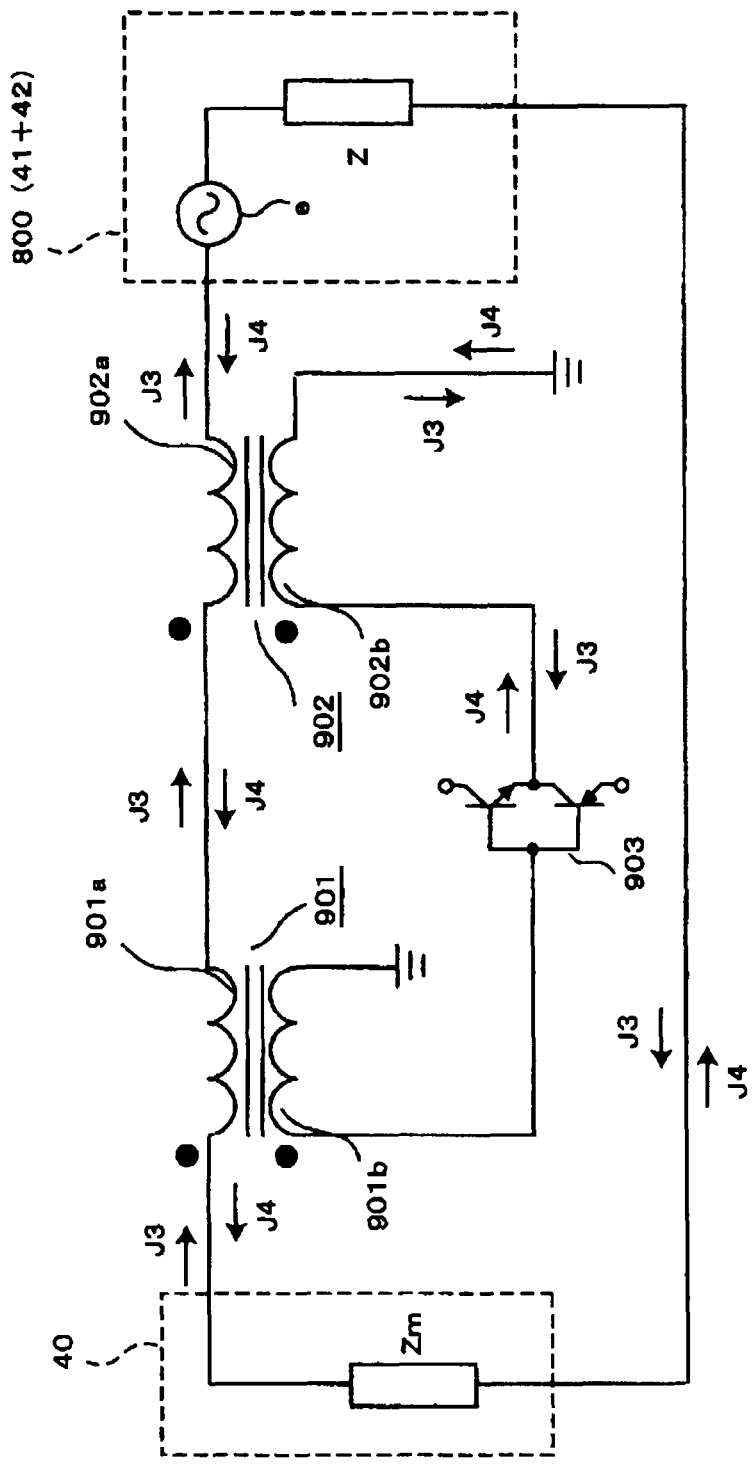
FIG. 7 is a circuit diagram illustrating an equivalent circuit of a conventional high-frequency leakage current reduction apparatus.

FIGS. 1 to 7 illustrate a first embodiment for carrying out this invention. FIG. 1 is a configuration diagram illustrating a high-frequency leakage current reduction apparatus, FIG. 2 is a circuit diagram illustrating details of an amplifier, FIG. 3 is a connection diagram illustrating an example of connection of the high-frequency leakage current reduction apparatus, FIG. 4 is a circuit diagram illustrating details of a converter, FIG. 5 is a circuit diagram illustrating details of an inverter, FIG. 6 is a circuit diagram illustrating an equivalent circuit of the high-frequency leakage current reduction apparatus of FIG. 1, and FIG. 7 is a circuit diagram illustrating an equivalent circuit of a conventional high-frequency leakage current reduction apparatus. Referring to FIG. 1, the high-frequency leakage current reduction apparatus 100 serving as a leakage current reduction apparatus includes first and second common-mode transformers 1, 2 and a voltage amplifier 3. The first common-mode transformer 1 serving as a voltage detector includes three-phase windings 11, 12, 13 which serve as main windings and a winding 14 for common-mode voltage detection which serves as a winding for leakage current detection. The windings 11, 12, 13 and the winding 14 are each wound around an unillustrated iron core a specific number of times, that is, 5 times in this embodiment. Incidentally, the windings 11-14 are so wound as to have polarities indicated by ● to the left of the individual windings 11-14 in FIG. 1.

The second common-mode transformer 2 serving as a voltage applicator includes three-phase windings 21, 22, 23 which serve as main windings and a winding 24 for common-mode voltage application which serves as a winding for applying a voltage. The windings 21, 22, 23 and the winding 24 are each wound around an unillustrated iron core a specific number of times, that is, 5 times in this embodiment. Incidentally, the windings 21-24 are so wound as to have polarities indicated by ● to the left of the individual windings 21-24 in FIG. 1. The first common-mode transformer 1 and the second common-mode transformer 2 are connected by three-phase connecting lines 8r, 8s, 8t. The voltage amplifier 3 of which details are illustrated in FIG. 2 has power supply terminals 3a, 3b for receiving operating electric power for the voltage amplifier 3 and transistors 3d which are semiconductor devices. The voltage amplifier 3 receives the operating electric power from an unillustrated external power source. An output of the winding 14 for common-mode voltage detection is supplied to the transistor 3d and amplified in voltage by the voltage amplifier 3. An output voltage of the transistor 3d thus amplified is applied to the winding 24 for common-mode voltage detection.

As illustrated in FIG. 3, the high-frequency leakage current reduction apparatus 100 configured as described above is connected to an AC power supply 40 which serves as a first electrical device with the first common-mode transformer 1 of the high-frequency leakage current reduction apparatus 100 connected to the AC power supply 40 by connecting lines 91r, 91s, 91t for three phases R, S, T, as well as to a converter 41 which serves as a second electrical device for converting three-phase AC power into variable-voltage DC power by controlling ON/OFF states of insulated-gate bipolar transistors (IGBTs) 41a which serve as switching devices and semiconductor devices (refer to FIG. 4 for details) connected in a three-phase full-bridge configuration with the second common-mode transformer 2 connected to the converter 41 by connecting lines 93r, 93s, 93t for the three phases R, S, T. Connected to the converter 41 by connecting lines 49P, 49N is an inverter 42 for converting the DC power into variable-voltage, variable-frequency AC power by controlling ON/OFF states of IGBTs 42a which serve as switching devices and semiconductor devices (refer to FIG. 5 for details) connected in a three-phase full-bridge configuration. The inverter 42 supplies the variable-frequency, variable-voltage three-phase three-phase AC power to a three-phase motor 43 which acts as a load through connecting lines 95r, 95s, 95t.

Next, operation is described. The first common-mode transformer 1 detects a common-mode voltage V1 generated by common-mode currents which are high-frequency leakage currents that flow through the connecting lines 91r, 91s, 91t, or through the windings 11, 12, 13. While the high-frequency leakage currents generally fall within a frequency range of 150 kHz to 30 MHz, the embodiment is also applicable to cases where the high-frequency leakage currents are not limited to this frequency range. Incidentally, the common-mode voltage V1 is proportional to common-mode inductances, frequency and common-mode currents of the first common-mode transformer 1.

The common-mode voltage V1 is input into the voltage amplifier 3 and amplified by the number of times equal to gain (G) to produce an output voltage V2. This output voltage V2 is applied to the winding 24 for common-mode voltage application of the second common-mode transformer 2 in such a manner that the output voltage V2 works in generally the same direction as the common-mode voltage V1, whereby a voltage working as an application voltage in generally the same direction as the common-mode voltage V1 that acts as inductances for the aforementioned high-frequency leakage currents is applied to the windings 21, 22, 23 for the three phases R, S, T, respectively. In short, the voltage that works as the application voltage is generated. Specifically, the output voltage V2 is applied to the winding 24 of the second common-mode transformer 2 and the common-mode application voltage for the three-phase windings 21, 22, 23 is generated after the first common-mode transformer 1 has detected the common-mode voltage V1 generated by the common-mode currents and the common-mode voltage V1 has been amplified by G times. This is equivalent to a situation in which the second common-mode transformer 2 is associated with inductances created across both ends thereof that are gain G times as large as inductances of the first common-mode transformer 1. It is to be pointed out that the output voltage V2 applied to the winding 24 for common-mode voltage application need not strictly match the common-mode voltage V1 in phase but what is essentially needed is that the output voltage V2 have a polarity oriented in generally the same direction as the common-mode voltage V1 within a scope that does not impair the object of the invention.

Illustrated in FIG. 6 is an equivalent circuit of the high-frequency leakage current reduction apparatus 100 which is configured as described above and connected as depicted in FIG. 3. Referring to FIG. 6, the converter 41 and the inverter 42 of FIG. 3 are noise sources which are together represented as a noise voltage source 800, "e" indicating a noise voltage generated thereby. "Z" represents common-mode impedance of the noise voltage source 800 and "Zm" represents common-mode impedance of the AC power supply 40. An equivalent circuit of the first common-mode transformer 1 is represented by a transformer circuit 801 having primary and secondary windings 801a, 801b.

An equivalent circuit of the second common-mode transformer 2 is represented by a transformer circuit 802 having primary and secondary windings 802a, 802b. An equivalent circuit of the voltage amplifier 3 is represented by an amplifier circuit 803. The amplifier circuit 803 is connected to the secondary winding 801b (winding 14 for common-mode voltage detection) of the transformer circuit 801. Since the amplifier circuit 803 has a high input impedance, just a little current flows through the secondary winding 801b. Therefore, the common-mode voltage V1 is generated across the primary winding 801a of the transformer circuit 801 owing to a common-mode current J2. Also, a voltage k×V1 is applied across both ends of the secondary winding 802b (winding 24) of the transformer circuit 802 by the amplifier circuit 803. Accordingly, the common-mode current J2 is suppressed by the voltages generated across both ends of each of the primary windings 801a, 802a of the respective transformer circuits 801, 802.

Illustrated in FIG. 7, on the other hand, is an equivalent circuit of a conventional leakage current reduction apparatus. Referring to FIG. 7, a transformer circuit 901 having primary and secondary windings 901a, 901b for detecting a current, a transformer circuit 902 having primary and secondary windings 902a, 902b for injecting a current, and a current amplifier circuit 903 configured with transistors to serve as a current injection source are connected as illustrated. The current amplifier circuit 903 is connected to the secondary winding 901b of the transformer circuit 901, which amplifies a common-mode current J3 detected by the transformer circuit 901 by k times and outputs a current J4 (=J3×k). The current J4 flows into the primary winding 902a which is on a main winding side of the transformer circuit 902. Assuming here that k=1, the common-mode current is canceled out in any of wirings depicted in FIG. 7. The common-mode current J3 is suppressed in the aforementioned fashion. In actuality, however, the assumption k=1 is unsatisfied owing to variations in component properties and temperature changes, for instance, thus posing a problem that it becomes impossible to achieve a sufficient noise reduction effect.

According to the present embodiment, however, it is possible to suppress common-mode currents flowing through the three-phase windings 21, 22, 23 because inductance across both ends of each of the windings 21, 22, 23 of the second common-mode transformer 2 increases. Additionally, as a simple amplifier circuit made up of an operational amplifier, for instance, can be used as the voltage amplifier 3, it is possible to simplify the configuration of the voltage amplifier 3.

In addition, while the common-mode voltage V1 is detected by means of the first common-mode transformer 1, an input impedance of the voltage amplifier 3 is set at a large value so that a voltage across both ends of the winding 14 can be detected with high accuracy. This is because the accuracy of detection of the common-mode voltage V1 deteriorates if the input impedance is made small. In the conventional high-frequency leakage current reduction apparatus, on the other hand, it is necessary to detect a common-mode current and, therefore, it is necessary to set the input impedance at a relatively small value to allow a current to flow. For this reason, almost no common-mode impedance is produced in the conventional high-frequency leakage current reduction apparatus because the common-mode voltage produced in a transformer for current detection (current detection coil) is generally shorted in an output side winding (which corresponds to the winding 14 of FIG. 1). In this embodiment, however, the voltage is detected by the first common-mode transformer 1 under conditions where the common-mode voltage occurs, so that a noise reduction effect caused by the common-mode impedance produced by the first common-mode transformer 1 is superimposed, creating a further noise reduction effect.

Recently, switching devices made of silicon carbide (SiC), a gallium nitride material or diamond, for instance, which are examples of wide band-gap semiconductors are used as the switching devices like the IGBTs 41a of the converter 41 and the IGBTs 42a of the inverter 42, making it possible to achieve a higher speed of switching operation. As a result of this tendency toward the higher speed, however, the amount of noise tends to increase. The high-frequency leakage current reduction apparatus of the present embodiment can be operated in such a manner as to suppress high-frequency leakage currents and reduce generated noise without the need to select the type of the switching devices regardless of the presence of the aforementioned problem. Therefore, it is possible to effectively reduce noise generated by switching devices made of silicon carbide or the like that perform high-speed switching operation. Similarly, even if the voltage amplifier 3 employs switching devices made of wide band-gap semiconductors like silicon carbide, a gallium nitride material or diamond, for instance, as the transistors 3d to perform amplification, it is possible to alleviate the influence of noise generation and reduce high-frequency leakage currents.

Incidentally, if the high-frequency leakage current reduction apparatus 100 is installed between the AC power supply 40 and the converter 41 as illustrated in FIG. 3, it is possible to effectively suppress propagation of noise to the AC power supply 40 because all of common-mode currents generated by the converter 41 and the inverter 42 are subject to suppression.

Second Embodiment

Figure 8:
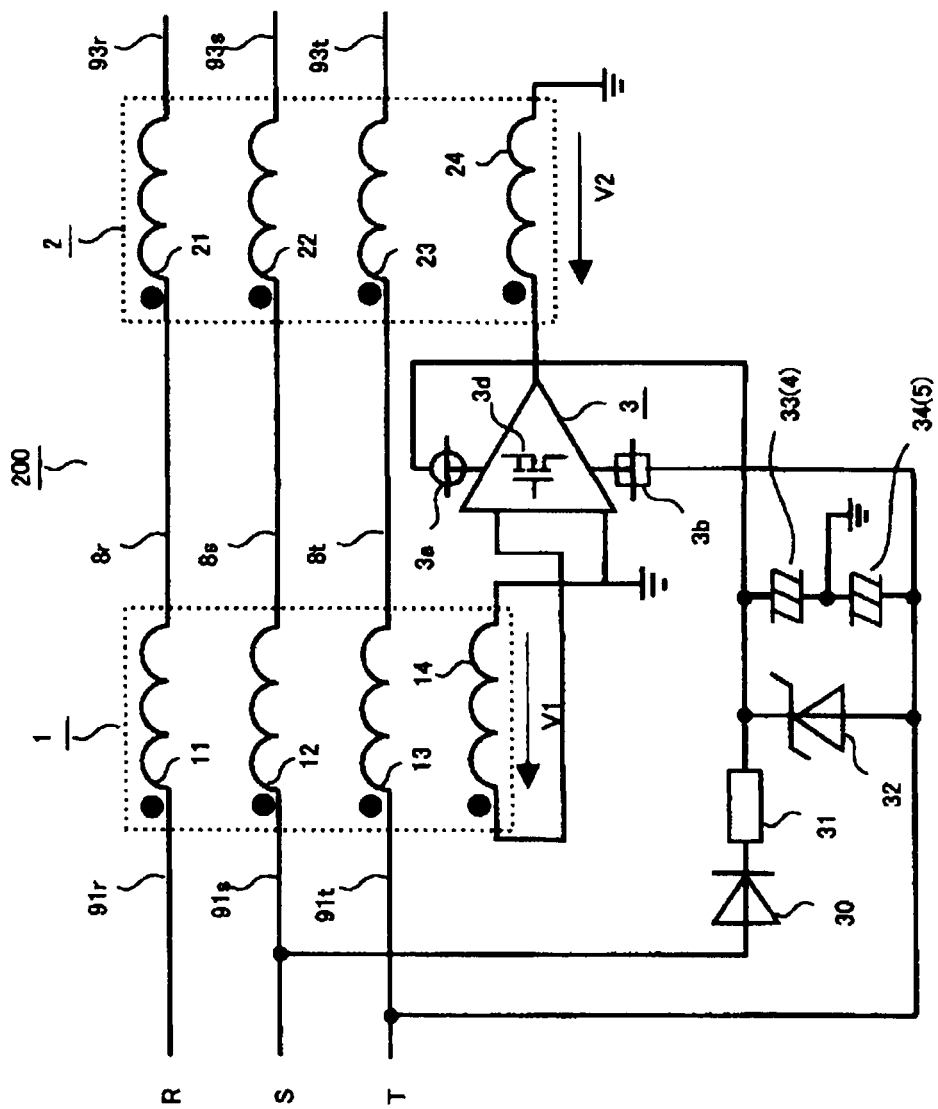
FIG. 8 is a configuration diagram illustrating a high-frequency leakage current reduction apparatus according to a second embodiment.

FIG. 8 is a configuration diagram illustrating the configuration of a high-frequency leakage current reduction apparatus according to a second embodiment. Referring to FIG. 8, the high-frequency leakage current reduction apparatus 200 serving as a leakage current reduction apparatus, which is used in place of the high-frequency leakage current reduction apparatus 100 of FIG. 3, supplies operating electric power (power source) for a voltage amplifier 3 to the voltage amplifier 3 from connecting lines 91s, 91t. The high-frequency leakage current reduction apparatus 200 is configured such that an anode side of a diode 30 is connected to the S-phase connecting line 91s while a cathode side is connected to the side of a capacitor 33 of a series circuit of the capacitor 33 and a capacitor 34 through a resistor 31. The side of the capacitor 34 of the series circuit of the capacitor 33 and the capacitor 34 is connected to the T-phase connecting line 91t and a connecting point between the capacitor 33 and the capacitor 34 is grounded. Also, a Zener diode 32 is connected parallel to the series circuit of the capacitor 33 and the capacitor 34.

An AC voltage is produced between the S- and T-phase connecting lines 91s, 91t. This AC voltage is half-wave rectified by the diode 30 and a resultant voltage is divided by the resistor 31 and the Zener diode 32. Then, the capacitors 34 and 34 produce power sources 4 and 5, respectively, for driving the voltage amplifier 3. Here, the power sources 4, 5 are connected to power supply terminals 3a, 3b of the voltage amplifier 3, respectively. The high-frequency leakage current reduction apparatus 200 has otherwise the same configuration as that of the first embodiment illustrated in FIGS. 1 to 5, so that corresponding components are designated by the same symbols and a description of such components is not provided hereunder.

According to this embodiment, the DC power sources 4, 5 for driving the voltage amplifier 3 can be supplied from an AC power supply side as discussed above. Consequently, it becomes unnecessary to provide an isolating transformer or a flyback converter, making it possible to achieve a size reduction and cost reduction of a power supply portion.

While the DC power sources 4, 5 for driving the voltage amplifier 3 are obtained from the AC power supply 40 (refer to FIG. 3) by using the connecting lines 91s, 91t in FIG. 8, it is possible to obtain DC power sources by rectifying power fed through the connecting lines 8r, 8s, 8t or by means of a series circuit of a pair of like capacitors connected between the connecting lines 49P and 49N depicted in FIG. 3, yet achieving the same advantageous effect.

Third Embodiment

Figure 9:
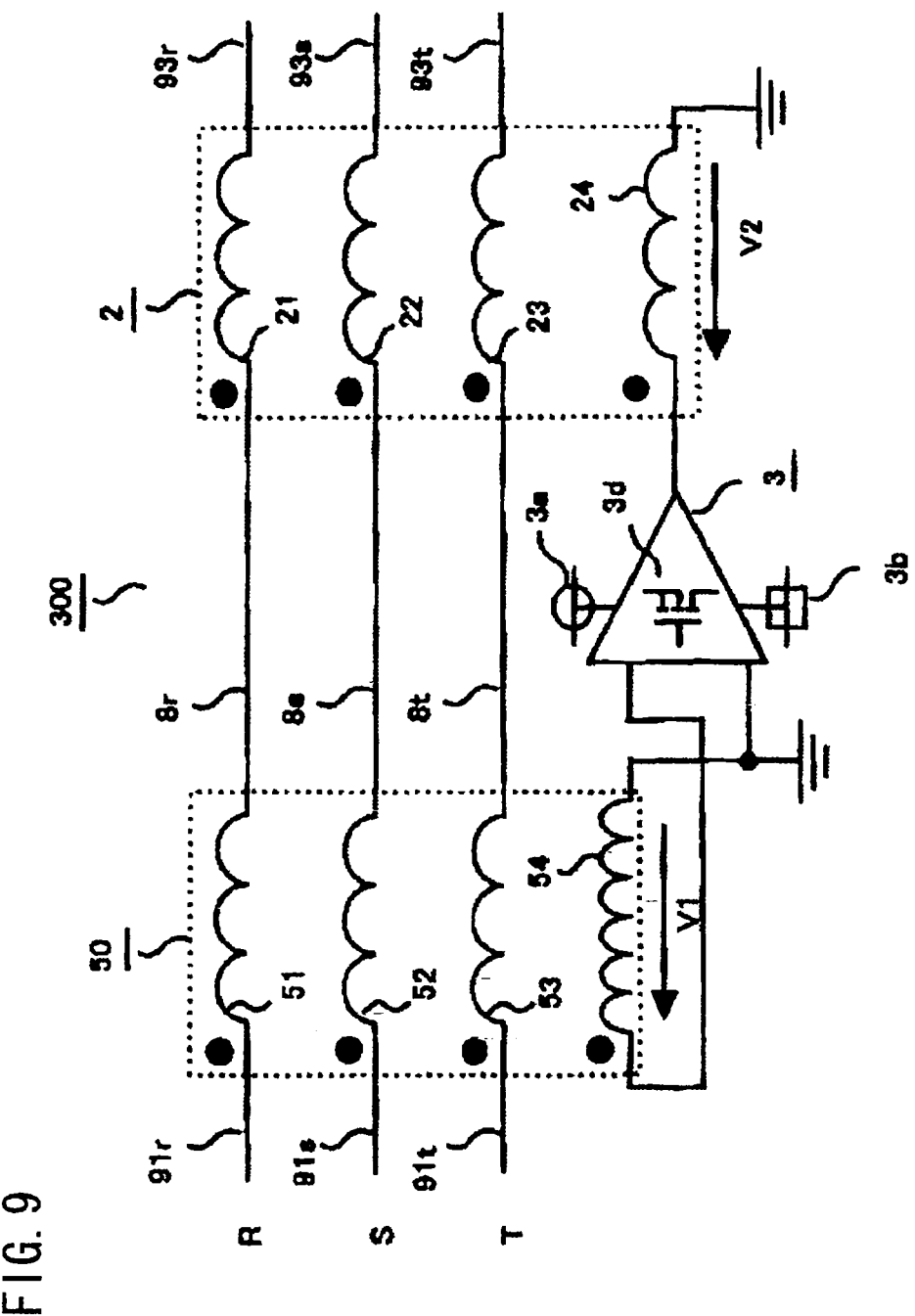
FIG. 9 is a configuration diagram illustrating a high-frequency leakage current reduction apparatus according to a third embodiment.

FIG. 9 is a configuration diagram illustrating a high-frequency leakage current reduction apparatus according to a third embodiment. Referring to FIG. 9, the high-frequency leakage current reduction apparatus 300 serving as a leakage current reduction apparatus includes a first common-mode transformer 50 which serves as a voltage detector. The first common-mode transformer 50 includes windings 51, 52, 53 and a winding 54 for common-mode voltage detection which serves as a winding for leakage current detection. Incidentally, the windings 51-54 are so wound as to have polarities indicated by ● to the left of the individual windings 51-54 in FIG. 9. The windings 51, 52, 53 are connected to three-phase connecting lines 91r, 91s, 91t, respectively. While the windings 51, 52, 53 are similar to those of the first common-mode transformer 1 of FIG. 1 and are each wound around an unillustrated iron core, the number of turns of the winding 54 for common-mode voltage detection is made N times as large as the number of turns of each of the windings 51, 52, 53 (where N is an integer equal to or larger than 2). Therefore, a detected value of a common-mode voltage becomes equal to V1×N. The high-frequency leakage current reduction apparatus 300 has otherwise the same configuration as that of the first embodiment illustrated in FIG. 1, so that corresponding components are designated by the same symbols and a description of such components is not provided hereunder.

As the detected value of the common-mode voltage is made N times as large, which means that the detected voltage is increased with the number of turns of the winding 54 for common-mode voltage detection made larger than the number of turns of each of the windings 51, 52, 53, as discussed above, inductances N×G times as large as the inductances of the first common-mode transformer 1 are added to the winding 24 of the second common-mode transformer 2. This makes it possible to further suppress common-mode currents that flow through the connecting lines 91r-91t and the windings 21, 22, 23. Also, when a large turns ratio N is to be set, it is possible to set the gain G of the voltage amplifier 3 at a relatively low level. This makes it possible to prevent the occurrence of a gain error or an offset error of the voltage amplifier 3. Additionally, even when the first common-mode transformer 1 having a small size and small inductances is employed, it is possible to detect a common-mode voltage of a sufficiently high level if N is set at a high level. Moreover, it is relatively easy to set N at a high level because the winding 54 is intended to be used for common-mode voltage detection and does not draw so large a current, allowing the use of a narrow wire.

Fourth Embodiment

Figure 10:
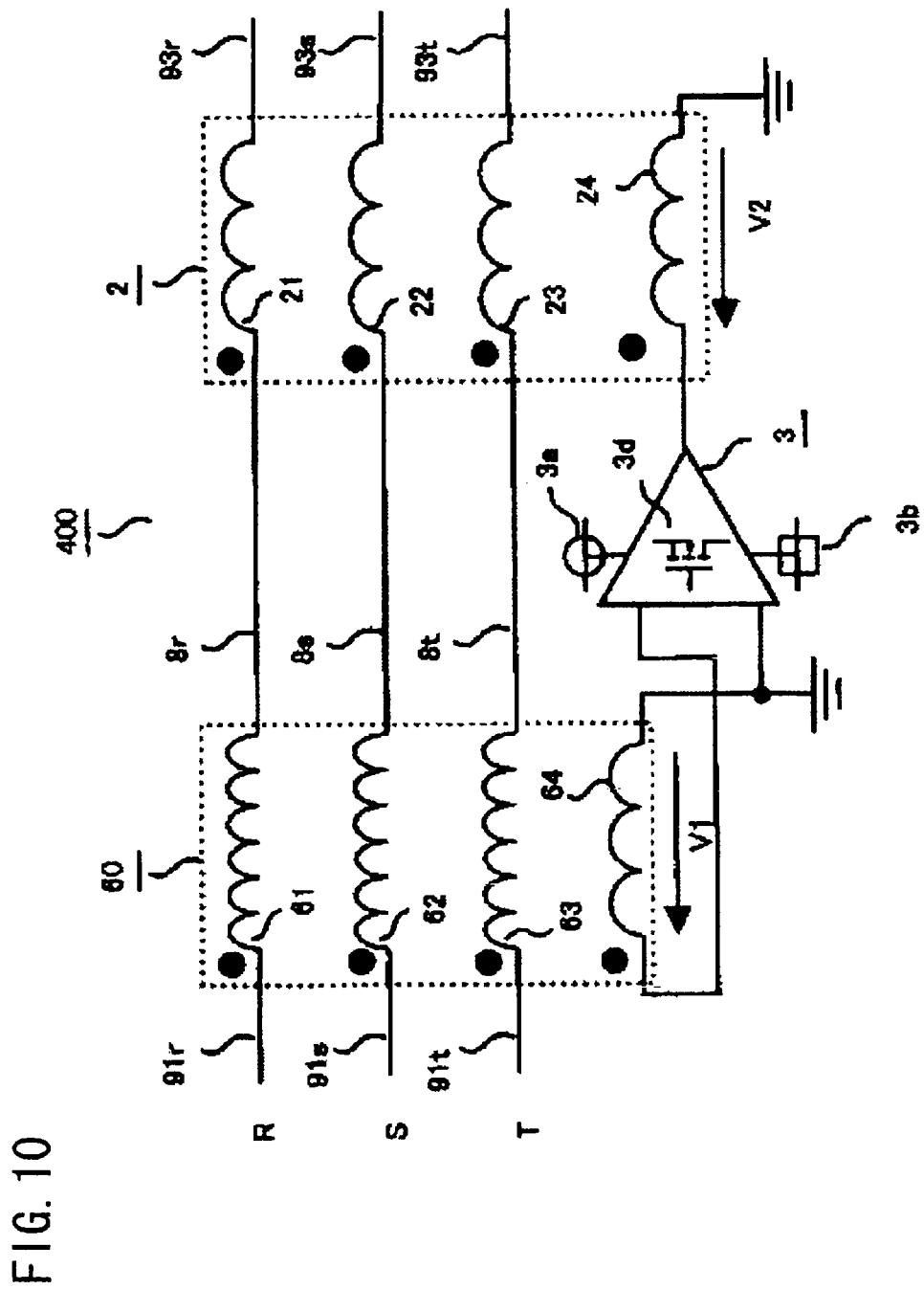
FIG. 10 is a configuration diagram illustrating a high-frequency leakage current reduction apparatus according to a fourth embodiment.

FIG. 10 is a configuration diagram illustrating a high-frequency leakage current reduction apparatus according to a fourth embodiment. Referring to FIG. 10, the high-frequency leakage current reduction apparatus 400 serving as a leakage current reduction apparatus includes a first common-mode transformer 60 which serves as a voltage detector. The first common-mode transformer 60 includes windings 61, 62, 63 and a winding 64 for common-mode voltage detection which serves as a winding for leakage current detection, the windings 61, 62, 63 being connected to three-phase connecting lines 91r, 91s, 91t, respectively. Incidentally, the windings 61-64 are so wound as to have polarities indicated by ● to the left of the individual windings 61-64 in FIG. 10. The windings 61, 62, 63 are similar to those of the first common-mode transformer 1 of FIG. 1 and are each wound around an unillustrated iron core.

In this embodiment, the number of turns of each of the windings 61, 62, 63 is made N times as large as the number of turns of the winding 64 for common-mode voltage detection (where N is an integer equal to or larger than 2). For this reason, a detected value of a common-mode voltage becomes equal to V1/N. Even when the number of turns of each of the windings 61, 62, 63 of the first common-mode transformer 60 employed is large, however, it is possible to set the number of turns of the winding 64 for common-mode voltage detection at a small value, thereby creating such an advantageous effect that the winding 64 can be easily mounted. Incidentally, although the detected value of the common-mode voltage becomes equal to V1/N, it is possible to obtain a desired leakage current reduction effect by setting the gain G at a large level.

Fifth Embodiment

Figure 11:
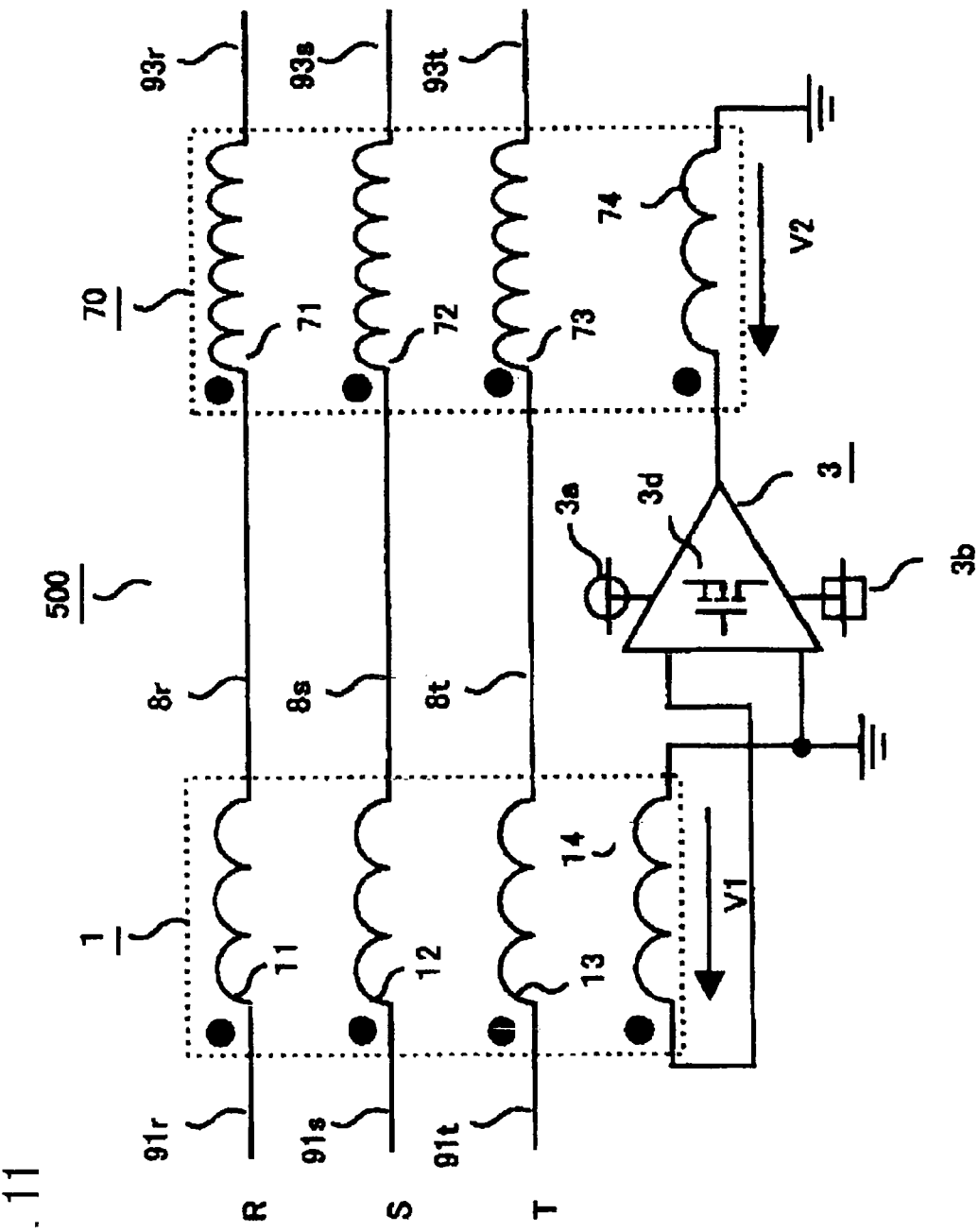
FIG. 11 is a configuration diagram illustrating a high-frequency leakage current reduction apparatus according to a fifth embodiment.

FIG. 11 is a configuration diagram illustrating a high-frequency leakage current reduction apparatus according to a fifth embodiment. Referring to FIG. 11, the high-frequency leakage current reduction apparatus 500 serving as a leakage current reduction apparatus includes a second common-mode transformer 70 which serves as a voltage applicator. The second common-mode transformer 70 includes windings 71, 72, 73 and a winding 74 for common-mode voltage application which serves as a winding for applying a voltage, the windings 71, 72, 73 being connected to three-phase connecting lines 93r, 93s, 93t, respectively. Incidentally, the windings 71-74 are so wound as to have polarities indicated by ● to the left of the individual windings 71-74 in FIG. 11. The windings 71, 72, 73 are similar to those of the second common-mode transformer 2 of FIG. 1 and are each wound around an unillustrated iron core.

In this embodiment, the number of turns of each of the windings 71, 72, 73 is made N times as large as the number of turns of the winding 74 for common-mode voltage application (where N is an integer equal to or larger than 2). For this reason, voltages applied to the windings 71, 72, 73 of the second common-mode transformer 70, or voltages generated, become N times as large as the voltage V2 applied to the winding 74, making it possible to obtain a voltage amplification effect with the second common-mode transformer 70. Therefore, it is possible to set the gain G of the voltage amplifier 3 at a low level. This makes it possible to prevent the occurrence of a gain error or an offset error of the voltage amplifier 3.

Sixth Embodiment

Figure 12:
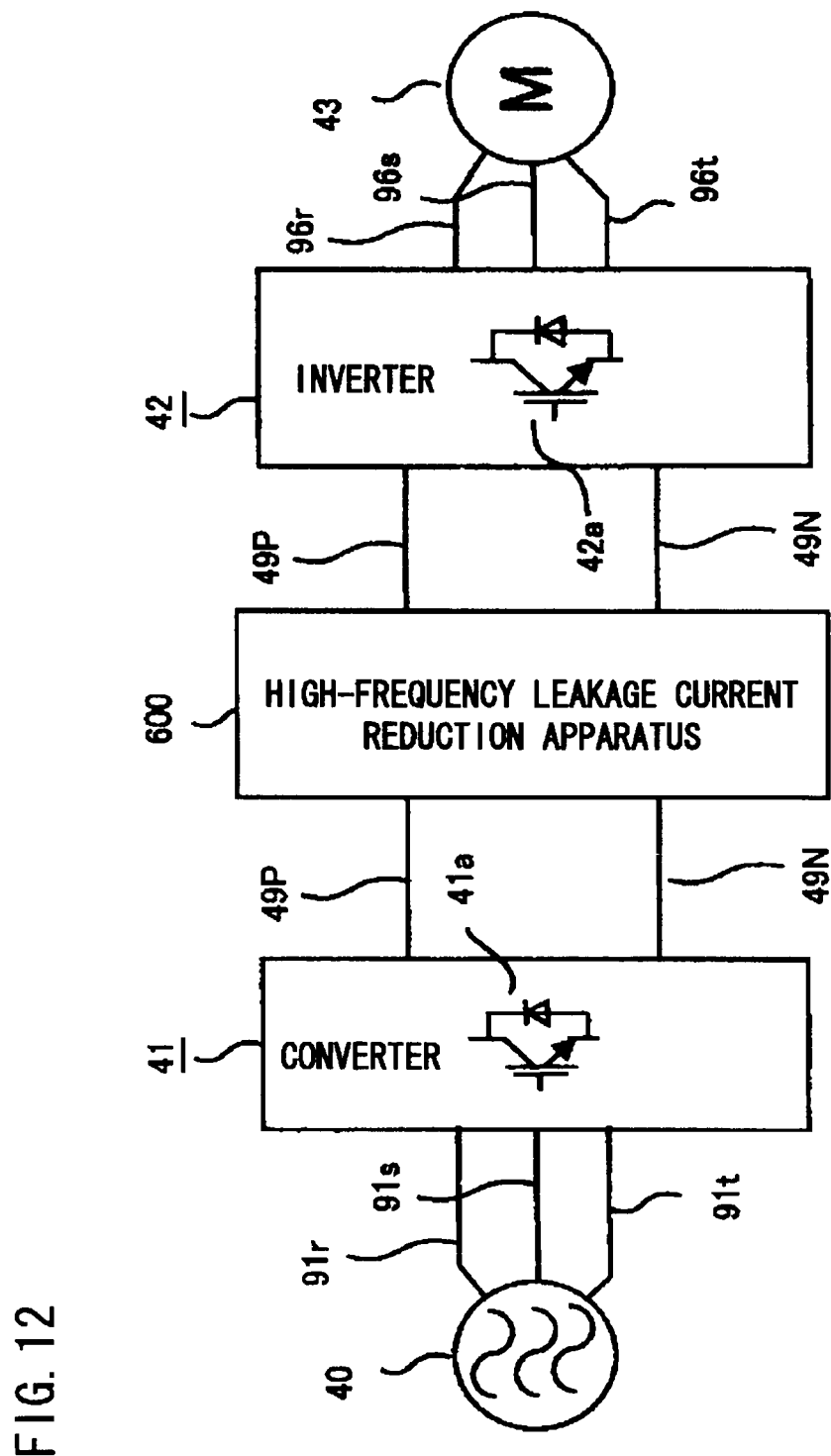
FIG. 12 is a connection diagram illustrating another example of connection of a high-frequency leakage current reduction apparatus according to a sixth embodiment.
Figure 13:
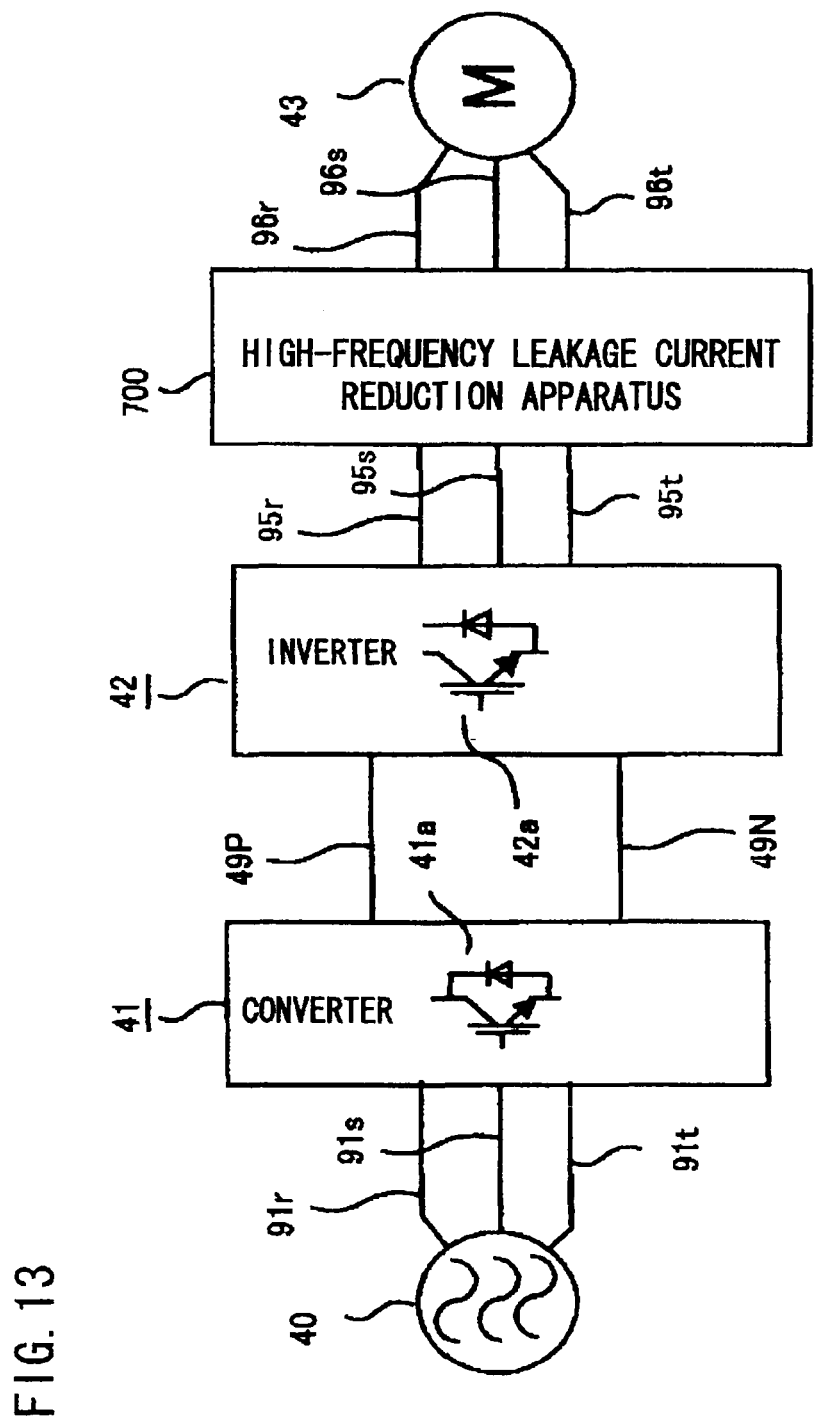
FIG. 13 is a connection diagram illustrating still another example of connection of a high-frequency leakage current reduction apparatus according to the sixth embodiment.

FIGS. 12 and 13 illustrate a sixth embodiment, FIG. 12 being a connection diagram illustrating another example of connection of a high-frequency leakage current reduction apparatus, and FIG. 13 being a connection diagram illustrating still another example of connection. Referring to FIG. 12, a converter 41 serving as a first electrical device is connected to an AC power supply 40 and a high-frequency leakage current reduction apparatus 600 serving as a leakage current reduction apparatus is connected between the converter 41 and an inverter 42 which serves as a second electrical device. An AC output side of the inverter 42 is connected to a three-phase motor 43 to drive the same by variable-voltage, variable-frequency three-phase AC power. Incidentally, as the high-frequency leakage current reduction apparatus 600 is installed on a DC side, the high-frequency leakage current reduction apparatus 600 has a slightly different configuration from the high-frequency leakage current reduction apparatus 100 illustrated in FIG. 1 which is installed on an AC side in that the former requires only two main windings through which DC power flows. The high-frequency leakage current reduction apparatus 600 however has the same function as the high-frequency leakage current reduction apparatus 100 illustrated in FIG. 1.

If the high-frequency leakage current reduction apparatus 600 is installed between the converter 41 and the inverter 42 as described above, it is possible to reduce the numbers of windings of first and second common-mode transformers 1, 2 by one each because there exist only two, i.e., positive and negative, connecting lines (49N and 49P) on each side. This makes it possible to achieve a further reduction in size and cost of the high-frequency leakage current reduction apparatus.

It is also possible to install a high-frequency leakage current reduction apparatus 700 serving as a leakage current reduction apparatus between an inverter 42 which serves as a first electrical device and a three-phase motor 43 which serves as a second electrical device as illustrated in FIG. 13 and connect these devices by connecting lines 95r, 95s, 95t shown to the left of the high-frequency leakage current reduction apparatus 700 illustrated in FIG. 13 and connecting lines 96r, 96s, 96t shown to the right of the high-frequency leakage current reduction apparatus 700 illustrated in FIG. 13. It is to be noted that the high-frequency leakage current reduction apparatus 700 has the same function as the high-frequency leakage current reduction apparatus 100 illustrated in FIG. 1 although the former slightly differs from the latter in specifications.

In the high-frequency leakage current reduction apparatus 600 illustrated in FIG. 12, a DC power source for driving the voltage amplifier 3 may be taken from the connecting lines 49P, 49N on the side of the converter 41 or from the connecting lines 49P, 49N on the side of the inverter 42. Also, in the high-frequency leakage current reduction apparatus 700 illustrated in FIG. 13, a DC power source for driving the voltage amplifier 3 may be obtained by rectifying the AC power fed from the connecting lines 95r, 95s, 95t or the connecting lines 96r, 96s, 96t in the same fashion as the high-frequency leakage current reduction apparatus 200 illustrated in FIG. 8.

Additionally, while the foregoing individual embodiments have described the configurations in which the first and second common-mode transformers have the windings 11-13, 14 or 21-23, 24, etc. which are each wound around the iron core, the invention is not limited to these configurations. For example, even if the first and second common-mode transformers are such that the connecting lines 91r, 91s, 91t pass through an annular iron core and the winding 14 for common-mode voltage detection or the winding 24 for common-mode voltage application is wound around the annular iron core, the same advantageous effect is produced.

Furthermore, even if the converter 41 is a diode converter made of diodes alone, the same advantageous effect is produced.

The invention claimed is:

1. A leakage current reduction apparatus comprising a voltage detector, a voltage amplifier and a voltage applicator, said leakage current reduction apparatus being inserted between a first electrical device and a second electrical device by way of three-phase three-wire connecting lines, wherein
said voltage detector has a winding for leakage current detection and main windings connected individually to the three-phase three-wire connecting lines, and detects a leakage current flowing the three-phase three-wire connecting lines through the main windings by detecting a voltage of the winding for leakage current detection as a detected voltage;
said voltage amplifier amplifies said detected voltage and outputs an amplified voltage as an output voltage; and
said voltage applicator has a winding for voltage application and main windings connected individually to the three-phase three-wire connecting lines, and generates an application voltage in the three-phase three-wire connecting lines through the main windings
wherein the main windings of said voltage detector and the main windings of said voltage applicator are connected respectively in series and are inserted between said first electrical device and said second electrical device by way of the three-phase three-wire connecting lines, and
wherein said voltage applicator generates the application voltage by applying the output voltage of said voltage amplifier to the winding for voltage application, and a polarity of said application voltage is the same as that of said detected voltage.

2. The leakage current reduction apparatus as recited in claim 1, wherein said voltage detector is such that the number of turns of the winding for leakage current detection is larger than the number of turns of each of the main windings.

3. The leakage current reduction apparatus as recited in claim 1, wherein said voltage detector is such that the number of turns of each of the main windings is larger than the number of turns of the winding for leakage current detection.

4. The leakage current reduction apparatus as recited in claim 1, wherein said voltage applicator is such that the number of turns of each of the main windings is larger than the number of turns of the winding for voltage application.

5. The leakage current reduction apparatus as recited in claim 1, wherein said first electrical device is an AC power supply and said second electrical device is a converter which converts AC power fed from said AC power supply into DC power.

6. The leakage current reduction apparatus as recited in claim 1, wherein said first electrical device is an inverter which converts DC power into AC power and said second electrical device is a load driven by said inverter.

7. The leakage current reduction apparatus as recited in claim 1, wherein said first electrical device is a power converter which has a switching device and performs power conversion between DC and AC by turning on and off the switching device, the switching device being made of a wide band-gap semiconductor.

8. The leakage current reduction apparatus as recited in claim 1, wherein said second electrical device is a power converter which has a switching device and performs power conversion between DC and AC by turning on and off the switching device, the switching device being made of a wide band-gap semiconductor.

9. The leakage current reduction apparatus as recited in claim 1, wherein a power source for driving said voltage amplifier is obtained from the three-phase three-wire connecting lines.

10. The leakage current reduction apparatus as recited in claim 1, wherein said voltage amplifier amplifies said detected voltage by means of a semiconductor device made of a wide band-gap semiconductor.

11. The leakage current reduction apparatus as recited in claim 7, wherein the wide band-gap semiconductor is silicon carbide, a gallium nitride material or diamond.

12. The leakage current reduction apparatus as recited in claim 8, wherein the wide band-gap semiconductor is silicon carbide, a gallium nitride material, or diamond.

13. The leakage current reduction apparatus as recited in claim 10, wherein the wide band-gap semiconductor is silicon carbide, a gallium nitride material, or diamond.

* * * * *